United States Patent [19]
Tanner et al.

[11] 3,745,927

[45] July 17, 1973

[54] CASING AND PROPELLANT OF NITROCELLULOSE FILAMENTS AND NITROCELLULOSE FIBERS

[75] Inventors: Ernst Tanner, Asheville, N.C.; James R. Sides, Fairfax City, Va.

[73] Assignee: Celanese Corporation, New York, N.Y.

[22] Filed: May 20, 1969

[21] Appl. No.: 826,109

[52] U.S. Cl.................. 102/103, 86/23, 149/15, 149/19, 149/20, 149/21, 149/38, 149/39, 149/42, 149/44, 149/43, 149/92, 156/172
[51] Int. Cl................................................ F42b 5/16
[58] Field of Search..................... 102/103, 100, 98, 102/99; 147/2, 15; 86/23; 149/19, 20, 21, 38, 39, 42, 44, 43, 92; 156/172

[56] References Cited
UNITED STATES PATENTS
| | | | |
|---|---|---|---|
| 2,780,997 | 2/1957 | Baker | 102/100 |
| 3,213,793 | 10/1965 | Dratz | 102/100 |
| 3,304,867 | 2/1967 | Nadel | 102/98 |

*Primary Examiner*—Carl D. Quarforth
*Assistant Examiner*—Stephen J. Lechert, Jr.
*Attorney*—Thomas J. Morgan, Stephen D. Murphy and Louis Gubinsky

[57] ABSTRACT

Autocombustible structural members for space vehicles, for example rocket casings and propellant grains, formed and reinforced with autocombustible nitrocellulose filaments.

7 Claims, 3 Drawing Figures

ERNST TANNER
JAMES RALPH SIDES
INVENTOR.

CASING AND PROPELLANT OF NITROCELLULOSE FILAMENTS AND NITROCELLULOSE FIBERS

This invention relates to high strength destructible structures, and, more particularly, to nitrocellulose base autocombustible structural elements or composites.

The advent of much modern technology has emphasized the need for light weight, high strength materials, e.g. capable of withstanding substantial pressure over a wide temperature range. Such qualities are particularly important for applications in the fields of cryogenics, space vehicles and equipment, deep sea apparatus, etc. While plastic materials are desirable for these as other applications, and certain high strength plastics are available, no plastic basic load-bearing structural elements have demonstrated properties permitting use in certain forbidding environments such as those present in cryogenic reseach, space exploration, etc. where it may be necessary for the material to withstand substantial hydrostatic pressures under severe thermal cycling or with a considerable thermal gradient across a given cross-section.

Therefore, it is an object of this invention to provide high strength load-bearing elements and composites capable of reliable use under these adverse conditions and consisting principally of a light weight plastic material.

In certain of these applications, and notably in rocket or space vehicles, considerations of ready destructibility are crucial. For example, whether single or multistage rocket construction is employed, rocket launchings are fraught with danger or ground personnel, since either separable boosters or the load itself fall eventually to earth, even where orbital insertion is effected. While this problem can be mitigated by launches over relatively unpopulated areas, many types of investigations, e.g. of atmospheric conditions, require operations in the vicinity of population centers.

Conventionally, various destruct mechanisms have been employed with frangible boosters to reduce this hazard, but these mechanisms add weight to the rocket and displace useful payload. Moreover, particle sizes after destruct are often still large enough to inflict injury.

The danger is even greater with orbital 'space garbage', such as burned out booster stages or defunct satellites, since these objects also pose collision problems for launchings on conflicting flight paths. The problem becomes alarmingly severe as the number of space launchings increase, since most such launchings occur from the same pads and similar or identical flight paths are employed. It is presently estimated that over 500 separate defunct man-made devices are in orbital patterns about the earth.

Of additional concern to these applications is the possibility of rendezvous and recovery of satellites or rocket vehicles which often embody novel and militarily important design features. Conventional destruct mechanisms are also unsatisfactory in this respect, since the relatively large particle sizes after destruct are only partly dispersed and may be recovered for investigation. Moreover, the weight of these destruct mechanisms is even less desirable for space applications.

Accordingly, an object of this invention is to provide high strength plastic structural elements capable of nearly complete destruction.

The destruction of certain preferred structures such as rocket motors or space vehicles desirably takes place at altitudes where available oxygen is limited or nonexistent. Thus, an even further object of this invention is to provide high strength plastic structures which are autocombustible, i.e., are capable of sustaining combustion in the absence of an external oxygen supply.

Moreover, in certain of the preferred aspects of this invention, e.g. where the structural elements form an integral part of a solid propellant grain, it is essential that the character of the plastic material does not detract from the grain thrust, and a corresponding object of this invention is the provision of high strength autocombustible plastic structural elements having a combustion character, e.g. specific impulse matching or exceeding the performance in these respects of its composite counterparts.

These and other objects which will appear to the artisan in the course of the following description have been attained where continuous nitrocellulose filamentary material having a nitrogen content of at least 12.0 weight percent and a tenacity of at least 0.5 grams per denier is employed as the principal plastic component in shaped articles constructed of one or more continuous filaments or multifilament yarns, generally disposed in a substantial alignment i.e. a regularly oriented (e.g. parallel) configuration in at least one dimension as distinguished from the random or irregular interlacings of a fibrous staple web. These constructions are generally non-woven, although they are often cross-lapped and may be closely structured or widely separateed by interstices consisting of other composite material. The articles consist principally of continuous as distinguished from staple filament, i.e. single ends originally extend throughout at least a major portion of the structure without interruption, and generally constitute the entire fibrous structure including any crosswebs.

The articles produced in accordance with this invention contain all of the desired properties of high strength, ready destructibility to light weight, small particle size combustion products, i.e., autocombustibility and high specific impulse, together with equally desirable machinability, low porosity and permeability, sustained structural integrity, etc., and are remarkably and markedly superior to prior constructions.

The invention is illustrated by the drawing wherein

Figure 1:
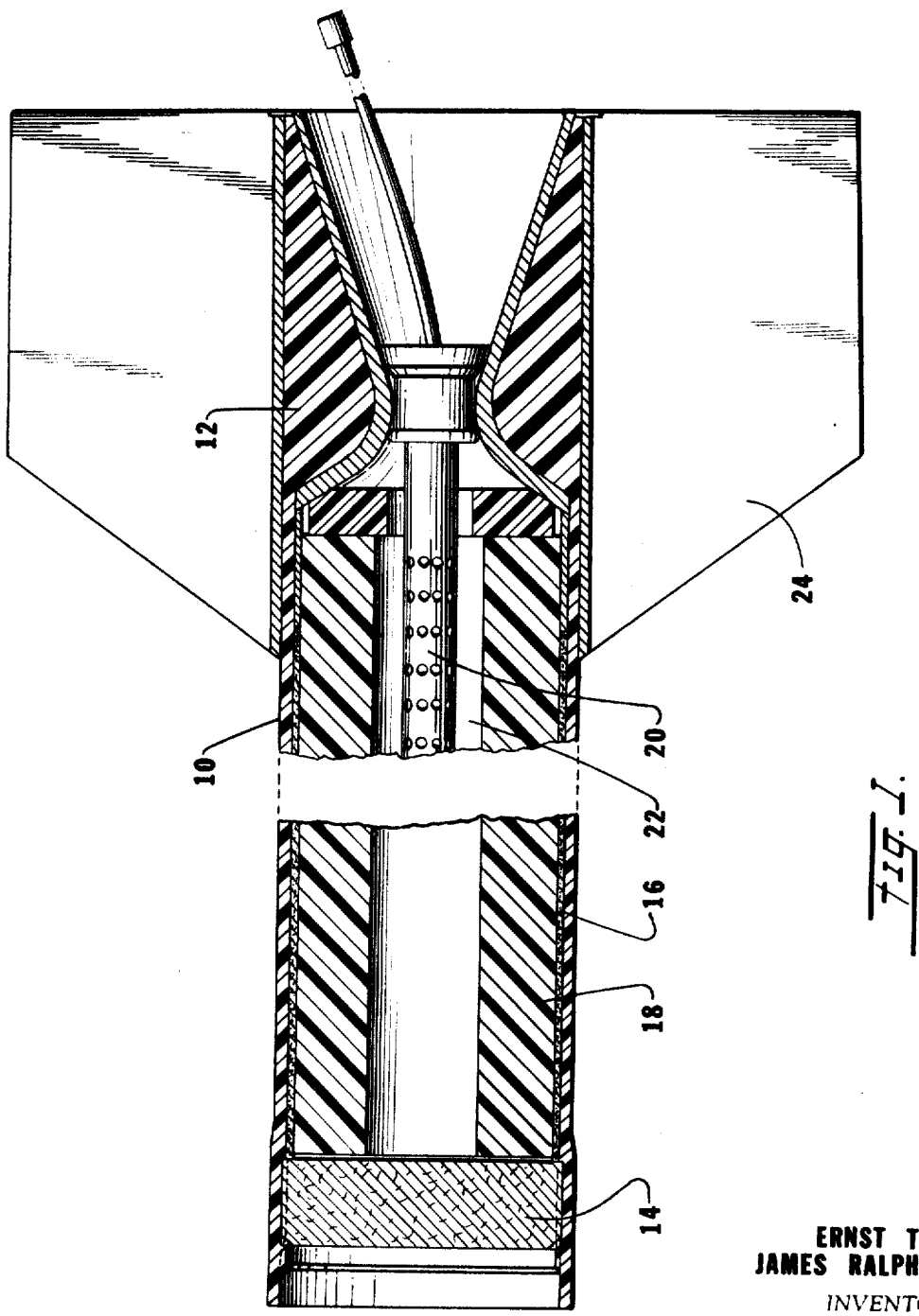
FIG. 1 is an integral rocket casing and nozzle in longitudinal cross-section.

The structures of this invention, prepared from continuous nitrocellulose filaments, exhibit unexpectedly great structural integrity even with conventional machining or under widely divergent temperature and pressure conditions, the products being capable of withstanding internal hydrostatic pressures generated by a rocket operating with flame temperatures of as much as 5,000°F. under external vacuum conditions and tempertures which may be as low as −65°F. or as high as 180°F. These recited characteristics do not, of course, inhere in the fiber alone, and cannot be provided by the fiber structures or prior teachings. Indeed, it appears that the selection of the nitrocellulose fiber and the use of the continuous filament constructions are independently necessary to the results achieved.

In accordance with one aspect of this invention, a rigid, loadbearing structural element is formed of an autocombustible composite consisting of continuous nitrocellulose filaments and a resinous binder therefor. For example, this autocombustible composite may be used to form an integral rocket body, including casing, nozzle, fins, etc.

Advantageously, the nitrocellulose fibers are high tenacity filaments produced by continuous wet-spinning and stretching, from solutions in organic solvents of nitrocellulose having a high nitrogen content of between about 12 and about 14 weight percent. The use of the preferred filaments, having a tenacity of above 1.5 grams per denier and an elongation at break of below 15 percent, produces structures of excellent strength and dimensional stability. Filaments of even high tenacities and elongations e.g. 2.6 grams per denier and 17 percent respectively, are, of course, even more desirable. Fibers of somewhat lower nitrogen content or other modified properties may be employed where the required strength for a particular application (e.g. for a rocket casing, ability to withstand high hydrostatic pressures and/or autocombustibility) are retained. Generally, any continuous nitrocellulose filament having a nitrogen content in excess of 12.0, preferably greater than 12.6, weight percent, and a tenacity of at least 0.5 is suitable. The continuous filaments may also be dry spun, but the process involves extensive precautions against combustion at high nitrogen levels, and therefore the wet-spinning is preferred. A representative such process is described in U.S. Pat. No. 3,256,371 to Rulison issued June 14, 1966 and incorporated herein by reference. The filaments are desirably take-up under tension, utilizing draw-down ratios of between about 2.5:1 and 100:1.

Multifilament yarns (contaning, for example, 100 to 1,500 filaments), bundles containing multiples thereof or monofilaments may be employed. The nitrocellulose fiber may also be used in the form of continuous roving, tow or woven tapes. While the denier per filament is generally from about 0.5 to 10.0 and preferably 2.0 to 5.0, filaments of 20 to 50 and even 60 to 2,000 dpf, described in the aforementioned Rulison patent, may also be employed where desirable. No particular cross-section is critical and the usual round or rectangular (e.g. 150 × 200 microns) configurations are acceptable. The rough, highly pitted surface structure of the filaments prepared by the Rulison process is particularly desirable for ready ignition and improved bonding. If desired, the filaments may be coated, e.g. with starch, polyvinyl alcohol, polyacrylic acid, styrene polymers or any conventional glass sizing.

In addition, the nitrocellulose filaments disclosed in both the Rulison patent and commonly assigned, co-pending application Ser. No. 557,600, filed June 13, 1966, of which Rulison is also the inventor, are particularly suitable for use in the practice of the present invention due to their low dry to wet strength loss, i.e. low moisture sensitivity. Such yarn can be wound under high tension into tight yarn packages and stored and/or shipped in a wet environment, i.e. immersed in water, without danger of combustion while maintaining the yarn tenacity required for high tension winding into the autocombustible products as described herein.

The nitrocellulose filaments may be used alone, or in conbination with other fibrous substances, and in constructions employing filaments or filament yarns consisting wholly or partly of heterofilamentary material. For example, composite filaments may be spun from dope consisting of a mixture of fiber-forming material, or composite yarns formed by intertwining monofilaments or monofilament bundles of the respective fibers. The composite filaments or yarn constructions may include beta-glass, fiberglass, polymetaphenylene isophthalamide, polyhexamethylene adipamide, polybenzimidazole, or polyethylene terephthalate, for example. Of course, any of these materials may independently form part of the composite product, as by a multiple bobbin winding process yielding, e.g. a 1:1 up to 10:1 nitrocellulose/fiberglass wound rocking casing and the proportion of nitrocellulose/heterofilament may be varied throughout the length of cross-section of the shaped article even to the point of providing a multi-layered or multi-sectional construction in this respect.

The nitrocellulose material may, of course, include conventional stabilizers, combustion modifiers or deterrents, homogeneously dispersed therein or applied as a surface layer. Generally, from about 0.5 to about 3.0 weight percent of dibutyl phthalate is added to the spin-bath as a combustion deterrent and is thus uniformly incorporated in amounts from about 2 to about 10 weight percent (based upon the nitrocellulose) in the spun filaments. Where desirable, amounts from about 0.1 to about 5.0 weight percent (based upon the nitrocellulose content) of such substances as diphenylamide, ethyl centralite, methyl centralite, etc. as stabilizers or dinitrotoluene nitroglycerine as combustion additives may be employed.

For example, suitable nitrocellulose filaments of 3.56 dpf containing 10.0 percent dinitrotoluene, 5.7 percent dibutyl phthalate and 0.91 percent diphenylamine, may be prepared in accordance with Example XII of U.S. Pat. No. 3,256,371 by dissolving cellulose nitrate (having a nitrogen content of 13.13 percent and a degree of polymerization of 318), diphenylamine, dibutylphthalate, and dinirotoluene in a spinning solvent consisting of 91 percent acetone, 8 percent ethanol and 1 percent water (yielding a spinning solution containing 22.7 percent of cellulose nitrate based on the weight of the solution, 10.0 percent of dinitrotoluene, 5.5 percent of dibutyl phthalate and 1.0 percent diphenylamine based on the weight of the cellulose nitrate); extruding the resulting spinning solution vertically upward through a 400 orifice (80 micron diam.) spinnerette into a spin bath consisting of 19.8 percent acetone, 5.7 percent water, 2.7 percent dinitrotoluene, 1.5 percent dibutyl phthalate, 0.29 percent diphenylamine and the balance methanol, at 25°C.; and taking up yarn at a spinning speed of 77 meters/minute at a drawdown ratio of 2.9:1. Preferably, the additives are added directly to the coagulation bath for it has been found that much more uniform, homogeneous incorporation of additive materials into the resulting filaments is thereby effected. As described in said U.S. Pat. No. 3,256,371 of Rulison, incorporation of additives into the spinning dope frequently does not result in the required amounts of additives being found in the spun filaments.

Most advantageously, especially for rocket propellant grain constructions, from about 2.0 to about 10.0 weight percent of a metallic combustion modifier, and especially finely divided (e.g. 4–8 micron diameter) aluminium is incorporated in the nitrocellulose filaments to improve performance such as combustion stability.

The resinous binder, while not always necessary or desirable, is employed in this aspect of the invention in proportions depending on the degree of desired bonding or porosity and generally in amounts between about 10 and about 50 weight percent, based upon the total weight of binder and nitrocellulose. It may be applied to the surface of the fiber in a coating bath, may be sprayed onto the fiber during the construction of the shaped article, or may even by integrally incorporated in the filament of filament yarn. The amount of binder employed, of course, may be varied during construction of the shaped articles, e.g. to impart strength or reduced combustibility to a particular element or cross-section. Moreover, the binder may be employed as an initial or final coating to protect the filamentary structure e.g. in shipping.

Most advantageously, the resinous binder is a combustible, thermoset, rigid, brittle material and is employed in amount such that the composite structural member is substantially non-porous and non-permeable. Binders which may be cured to the thermoset condition by simple addition reactions, i.e. without splitting out of volatile by-products, are perferred, since by their use void-free articles may be produced without the use of high pressures during the curing step. Thus, while any epoxy, phenolic or polyester thermosetting condensation-type resins may be employed, the epoxy resins are preferred over such resins as phenol-formaldehyde.

The most common and most preferred epoxy resins are reaction products of an epihalohydrin and a polyhydric phenol e.g., epichlorhydrin and bisphenol A, having the general formula:

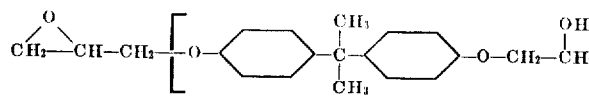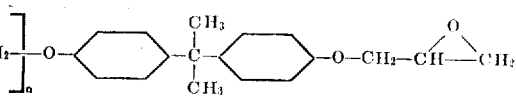

where n may range from zero (giving a molecular weight of 340) to about 10.

Other epoxy compounds useful as intermediates include epoxidized hydrocarbons such as vinyl cyclohexane dioxide, butadiene dioxide, dicyclopentadiene dioxide, epoxidized polybutadiene and limonene dioxide; epoxidized esters such as epoxidized unsaturated vegetable oils, epoxidized soy bean oil, epoxidized glycerol trilinoleate, and 3,4-epoxy-6-methylcyclohexylmethyl-3,4-epoxy-6-methylcyclohexane carboxylate, glycidyl ethers such as diglycidyl ether, n-butyl glycidyl ether, cyclohexyl glycidyl ether, phenyl glycidyl ether; and vinyl polymerizable monoepoxides and especially the glycidyl derivatives thereof such as allyl glycidyl ether, glycidyl acrylate, glycidyl methacrylate; etc.

Common hydroxy intermediates include certain halohydrins such as dichlorhydrin, or 1,2-dichloro-3-hydroxypropane; the mononuclear polyhydroxy phenols such as resorcinol, hydroquinone, pyrocatechol, saligenin, or phloroglucinol; the polynuclear polyhydroxy phenols such as bisphenol A, bisphenol F, trihydroxy diphenyl dimethyl methane, 4,4'-dihydroxy biphenyl bis(4-hydroxyphenyl)ethane, 1,5-dihydroxynaphthalene, or dihydroxy diphenyl sulfone; the novolac resins; the polyalcohols such as ethylene glycol, 2,3-butanediol, erythritol, glycerol, propylene glycol, diethylene glycol, hexanetriol, pentaerythritol, trimethylol ethane, trimethylol propane; etc.

The preferred epoxides are the glycidyl ethers of polyhydric phenols such as those obtained by reacting a polyhydric phenol in an excess of an ephihalohydrin in the presence of caustic. Most preferably, the resins are polymeric homologs of the diglycidyl ether of bisphenol A, the glycidyl ethers of bisphenol F, the glycidyl ethers of tetrakis (hydroxphenyl) ethane, and the epoxylated novolacs having epoxide equivalent weights of between about 170 and 190 and viscosities of 200 to 70,000 cps. Other suitable resins may be prepared by reacting 1.2 up to about 2 mols of epichlorhydrin with 1 mol of a dihydric phenol; diepoxides with added dihydric phenol; or a polyhydric alcohol and epichlorhydrins in the presence of an acidic catalyst (and subsequently treating the resulting product with an alkaline material). A general description of such polyepoxide resins may be found in *Epoxy Resins*, Lee and Meville (McGraw Hill Company, Inc., New York 1957)

To cure the resin to the thermoset, rigid state, a curing agent is generally added, usually just before the resin is applied, and the composite article is heat set.

The curing agents, as is well known in the art, may be bases, such as primary, secondary or tertiary amines (e.g. benzyldimethylamine, tri(dimethylaminomethyl) phenol, m-phenylene diamine, diethylene triamine, diethylamino propylamine, pentamethyl diethylene triamine, acids or acid anhydrides (e.g. oxalic acid, phthalic anhydride, pyromellitic dianhydride, etc.), or polyamides such as the reaction product of dimerized linoleic acid and a diamine (e.g. ethylene-diamine), which polyamides usually contain free amine groups as well as amide groups.

Curing times and temperatures abe complementarily effective and may be selected over a wide range. The temperature employed range from room temperature (20°C) up to below the decomposition temperature for any of the composite materials (e.g. 140°–160°C for the nitrocellulose component). While curing times may range from 1 hour to 24 hours, generally periods of about 4 to 8 hours are employed at temperatures in the range of 50 to 100°C. Atmospheric pressures are normally employed but moderate pressures of 1–5 atm. may prove desirable in specific applications.

The shaped composite articles may be formed in any manner which permits the retention of the continuous filament form, but the most convenient fabrication technique comprises winding onto a mold (e.g. a mandrel) of appropriate dimensions the filamentary material, (impregnated with the thermosetting resinous binder), and thereafter curing the resin, machining and finishing. The stiffness of this article may be improved by using a high winding tension, so that the nitrocellulose material is present in highly stretched condition in the composite. For example a tension load of 0.3 to 1.3 grams per denier may be suitably employed (attendant elongation ranges from 0.5 to 210 percent). Any conventional winding equipment adapted for use with wire or fiberglass is suitably employed, such as a Reeves Winder.

While the winding may be carried out at uniform density with any desired yarn spacing to any thickness, certain constructions (e.g. a unitary rocket motor case and nozzle) call for variation in density, yarn spacing, and/or thickness in certain portions of the structure. Most articles are more advantageously constructed with angular e.g. helical winding (in the manner of a wound ball of twine or cross-wrapped spool of thread), where the filaments are oriented during winding at a stationary or varied angle to a structural axis in any conventional manner, such as the selection of relative speeds of mandrel rotation and shuttle traverse, or angle of rotation. For example, articles having a generally cylindrical form with open ends and a number of cross wraps at any desired angle, or an ovaloid shape with closed ends or very narrow circular end apertures, may be readily prepared by this technique.

In each case, the mold about which the structural composite is shaped may be of any conventional type, including solid or inflatable mandrels; soluble, meltable or vaporizable salts, plastics or alloys, etc., and may be employed directly or with a surface coating e.g. a mold release agent. The mold also may consist of a desired payload or fuel grain.

A highly preferred embodiment of this invention comprises an integral rocket casing and nozzle, prepared by helically winding, at angles between about 20° and about 60°C from the longitudinal axis, continuous nitrocellulose filament carrying a surface layer of an epoxy resin binder, curing and heat setting. Such a casing has been found capable of withstanding hydrostatic pressures generated by high impulse polybutadiene-acrylic solid propellant contained therein, even under near vacuum external conditions. Moreover, the structure is combustible in the absence of external oxygen to a flaky residue constituting no more than 10 percent of the original weight.

In a representative such structure shown in FIG. 1 in a cross-sectional view, the unitary rocket casing 10 and nozzle 12 is fitted with a head closure 14 (in sealing relation with the cylindrical casing) and internally coated with an insulating layer 16 of a substance such as BUNA-N. The casing surrounds a suitable solid propellant grain 18 having a cylindrical core geometry, and carries in the nozzle throat an igniter 20 which extends into the core 22 of the grain 18. Fins 24 are mounted at the base of the rocket casing 10 in the nozzle region.

While this aspect of the invention has been described above primarily with reference to a preferred embodiment viz. a rocket casing, it should be understood that many other desirable articles may be prepared in a similar manner. For example, similar applications are other space vehicle housings or components, or articles to be employed in connection with such vehicles (which would otherwise become orbital space garbage) e.g. food containers, waste packages, air or other gas cylinders, etc. Moreover, the range of possible utility is not limited to the extraterrestial field, for it is often essential to military security that articles such as rifle stocks or barrels, food or water containers, etc. be destroyed without trace in alien territory.

Any of these structures may be ignited by unitary or separate igniter means, or by an adjacent element such as a solid propellant grain. That is, the final structure may contain or be attached to an electrically activated fuse means, or the article may be ignited by direct flame or heat generated by the combustion of an adjacent element e.g. by burn-through of the solid propellant grain contained by a rocket casing. Any conventional igniter is suitable, but generally a pyrogen is employed to ignite the rocket body, constituting a preferred embodiment of this invention. An insulating layer may be applied to any of the nitrocellulose surfaces, to protect against ignition by e.g. an anomalous propellant burn-through or by atmospheric friction, etc. The insulator is generally a resinous substance applied as a thin surface layer and consists, for example, epoxy composition optionally containing an inorganic filler such as asbestos, carbon black etc. The insulating liner may also serve as the propellant-case bonding agent.

While certain aspects of this invention employ an inert resinous, curable binder for the nitrocellulose, it should be understood that such binders are not essential to every aspect thereof and may be substituted for by other substances forming a coherent unitary structure with the nitrocellulose filamentary material. For example, it may be desirable to employ a binder only as an external and/or internal coating, relying upon winding tension to form a tightly adhered structure of nitrocellulose filament. In another specific embodiment, a solid propellant constitutes the continuous phase of the shaped article, and no binder as such is necessary. In such construction, the nitrocellulose filament carries out principally a reinforcing function, but does not detract from the specific impulse of the grain as do other conventional reinforcing members, such as metallic asbestos, carbon or glass rods or cones, etc. Such reinforcement in depth without reduced combustion performance becomes essential as grain diameters increase to e.g. the 260 inch dimensions presently employed in much large scale testing, especially since many of the high performance solid propellant grains are of low mechanical strength, even at low diameters and with end-burning construction.

In this aspect of the invention, a propellant grain is formed from a multiplicity of nitrocellulose filaments and a conventional solid propellant. The filaments are generally in substantial alignment e.g. parallelly oriented with respect to the longitudinal grain axis, and are usually relatively widely and uniformly spaced, e.g. at 0.01 to 0.1 inch intervals.

The filaments, while usually uniformly incorporated, may be arranged in any variable density configuration in any cross section, depending largely upon the points of stress in the grain, in turn dependent upon grain geometry.

The grains may have any normal internal or external configuration, but are generally cylindrical in shape, and are often cored with the conventional star, single or multiple port, cone, double anchor, multiple fin, etc., grain geometries.

In the case of cored grains, the filamentary reinforcement may consist of filaments parallel to the longitudinal axis of the grain and terminated at external surfaces of the grain or placed only internally of the grain. The filaments may also be desirably angularly oriented with respect to the longitudinal grain axis e.g. in the case of a cone-shaped core, in a tent-like orientation about the core.

Figure 2:
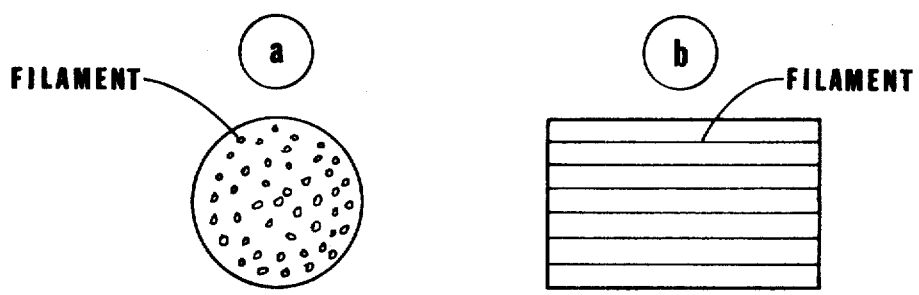
FIG. 2 depicts in (a) transverse and (b) longitudinal cross-sections a propellant grain and FIG. 3 is a longitudinal cross-sectional view of another propellant grain.

FIG. 2 of the drawings depicts in transverse (a) and longitudinal (b) cross-sections of propellant grain prepared according to this aspect of the invention. The nitrocellulose filaments extend the full length of the grain in a configuration parallel to the longitudinal axis and are surrounded by solid propellant.

Figure 3:
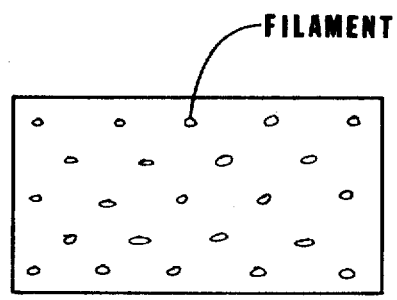

A modified such grain is shown in FIG. 3 where shorter lengths of nitrocellulose filament are oriented transversely to the longitudinal axis of the grain.

In a most advantageous aspect of the invention, the nitrocellulose filament rocket casing is employed in combination with one or more solid propellant grains. The solid propellant preferably provides a variable or intermittent thrust sequence, either by employing a nozzle throat valve, a valve means intermediate separate oxidizer and fuel grains arranged in tandem relation, or separate grain igniters. The solid propellant grains are in turn preferably reinforced by nitrocellulose filaments.

Considering solid propellant grain compositions in greater detail, is has been found that in such combinations nitrocellulose fibers help improve markedly the mechanical properties of the solid propellant and greatly reduce, or eliminate, propellant slump on storage. At the same time, since the fibers are themselves propellants, they have little if any adverse effect on the propulsive performance of the propellant.

The improved mechanical properties of the propellant can be obtained by the incorporation of surprisingly small proportions of nitrocellulose fiber, e.g. as little as about one-half percent by weight or less.

Excellent results are obtained when chopped nitrocellulose fiber is mixed into the propellant prior to the curing of the latter. Here small proportions of fiber by weight are preferably employed, (below 5 percent and advantageously below 1 percent, e.g. 0.1 to 0.6 percent) since large quantities make it more difficult to process the propellant into the desired shape. Also it is advantageous, for ease of processing, to employ fibers of at most about one-half inch in length, e.g. of about one-eighth inch in length. The blend of propellant and fiber is molded into the desired grain shape and then cured, e.g. to convert the propellant into a moderately cross-linked rubbery material in the usual manner.

When chopped fibers are employed they are usually not oriented in any particular direction in the propellant. Alternatively, oriented fibers may be employed, as by disposing closely spaced parallel continuous filaments of nitrocellulose under tension in the mold and then loading the mold with the viscous uncured propellant, and thereafter curing the propellant with the filaments maintained in their substantially parallel spaced positions. The filaments may extend longitudinally or transversely of the major axis of the rocket grain, or at any suitable angle to that axis, or various groups of parallel filaments may extend in different directions, at angles to each other. Cloth woven from the nitrocellulose filaments may also be employed as the reinforcement. In all these arrangements proportions of nitrocellulose fiber well below 1 percent have produced significant improvements in the mechanical properties of the propellant.

Another technique for combining the nitrocellulose fiber with the propellant is by winding the fiber about a mandrel while impregnating the windings with a propellant. In this manner grains of very high strength may be obtained.

The nitrocellulose fibers may also be employed in making case-bonded grains; here the mold used may be the rocket motor case itself or, particularly when the fiber winding technique is employed, the preshaped grain may be inserted into a closely fitting motor case and bonded thereto using any suitable bonding agent, e.g. the same binder as that used in the propellant.

For best results the surfaces of the nitrocellulose fibers should be wet thoroughly with the propellant. For this reason it is often advantageous to use individual separate filaments rather than twisted multifilament yarns since the propellant may sometimes not penetrate the yarn and wet the fiber surfaces in the interior of the yarns unless special treatments are employed. When such wetting does not take place the auto-ignition temperature of the propellant may decline to that of the nitrocellulose.

The rocket motor case used with the fiber-containing propellants is advantageously also constructed of nitrocellulose fibers, in the manner described earlier in this specification.

EXAMPLE I

A yarn of 400 continuous nitrocellulose filaments (3.75 dpf) having a nitrogen content of 12.6 percent, a tenacity of 2.5 grams/denier, an elongation at break of 9 percent, an initial modulus of $1.5 \times 10^6$, a specific gravity of 1.61 and a specific impulse of 226 lb-sec/lb. (and containing about 1 weight percent of diphenylamine as a stabilizer) was passed through a bath containing Shell Epon 820 epoxy resin and a suitable catalyst therefor and circumferentially wound around a mandrel of 3¼ inch diameter in closely spaced turns side by side, to a thickness of about 0.15 inches, composed of about 15 layers of the wound yarn. The resulting cylindrical product suitable as a rocket casing contains about 65 percent continuous nitrocellulose fiber and about 35 percent of the binder resin. Cylindrical rings of about 0.4 inch length cut from the product exhibited an ultimate hoop stress of 23,000 psi and an elongation at break of 5 percent.

Under atmospheric conditions a 0.90 inch long specimen (26.86 grams) was reduced to 8 percent of its original weight upon ignition (effected by suspending the specimen upon an electrically conductive wire charge with 10 amps for 5 seconds). The residue (2.19 grams) flaked and decomposed readily. Similar tests under conditions simulating those of 125,000 and 250,000 feet altitude also yielded 92 percent reductions in weight. No change in the nature of the residue was noted, although burning times increased from the original 15 seconds to 30 seconds at the 250,000 feet conditions.

EXAMPLE II

In this example there was produced a rocket motor case 25 inches long, 3.13 inches in inside diameter and 0.175 inch thick, having the shape shown in FIG. I, from the same yarn and in the same fashion as described in Example I, except that the winding pattern was 1½ hoop layer to each helical layer with a helical winding angle of 30°. The proportions used were 65 percent yarn and 35 percent resin and the impregnation was carried out in the same manner as in Example I. Curing occurred on standing at room temperature.

A sample of the composite case was subjected to a standard vacuum stability test wherein the sample liberated 0.0208 milliliters of gas per gram per hour at 100°C. over a test period of 65 hours.

A capped 1.75 inch sectional specimen of the case was inserted in test chamber containing circulating air at 700°C, and required only 7 seconds to ignite. Insulated specimens having a surface coating of 0.03 inch thick epoxy resin registered ignition times of about 24–28 seconds while otherwise identical coating containing 30 percent of asbestos exhibited increased ignition time to about 52 seconds. All insulation coatings yielded a hard surface resistant to scratching.

Substantially identical reasults were obtained with a casing of 0.069 inch thickness.

EXAMPLE III

A 30 inch long cylindrical casing was prepared as described in Example I with a 3¼ inch inside diameter and a 0.150 inch wall thickness employing a binder composition consisting of 100 parts Epon 826, 56 parts Shell RTH, 1 part RTA. Epon 826 is an epoxy resin available from Shell Chemical Company, chemically a diglycidyl ether of bisphenol A having an average viscosity of about 12,000 to 16,000 cps. RTH and RTA are epoxy hardener and softener, respectively, available from the same source. The curing cycle is 29 hours at 70°F. followed by 24 hours at 130°F. A tension of 4–5 lbs. was applied throughout the winding and 40 weight percent of resin was incorporated. Hoop tensile values ranged between 22,600 and 28,000 psi in five ½ inch × 0.150 inch (cross-sectional area) samples cut from the casing, and hoop shear values taken on three ½ inch × 0.075 inch samples were in the range 2,560–3,150 psi. The samples were readily machined from the rocket casing in conventional manner.

EXAMPLE IV

Continuous filament yarn of 1,500 denier nitrocellulose, which filaments have the properties set forth in Example I, were chopped to ⅛ inch lengths and blended with a mixture of 13.12 parts PBAA (a commercially available rocket fuel being a liquid copolymer of butadiene and acrylic acid in the ratio of about 9 to 1 which may be purchased from the American Synthetic Rubber Corporation, Louisville, Ky.), 2.78 parts of ERL-2795 (a "modified" epoxy resin available from Union Carbide Plastics Company containing in addition to its principal constituent, a prepolymer of bisphenol A and epichlorohydrin, a glycidyl ether viscosity regulator to form a more fluid product), 67.6 parts ammonium perchlorate and 15.9 parts finely divided aluminum of an average particle size of 5 microns. The ammonium perchlorate consisted of 16.90 parts of 35 micron average particle size, 30.42 parts of 200 micron average particle size and 20.28 parts of 600 micron average particle size, for a total of 67.60 parts per final grain composition. The proportion of chopped fiber was 0.6 percent by weight of grain composition. The resulting mixture was shaped into the form of a rocket grain in a mold and then cured (by heating at 140°F. for 72 hours). Tests showed that the mixture showed considerably less slump at 180°F. than a control of the same composition free of fibers. The tensile strength was 178 psi as compared to 103 psi for the control; modulus of elasticity was 2,640 psi as compared to 743 psi for the control; the elongation at break was 9.1 percent as compared to 19 percent for the control; the specific impulse (1,000 psi/psia) was 237.0 lb-sec/lb as compared to 236.9 for the control; the burning rate was 0.38 in/sec. as compared to 0.30 for the control, a further distinct advantage, while the pressure index (n) was 0.40 which was identical with that of the control. The density of the propellant containing the fibers was 0.060 lbs./cu.in. as compared to 0.062 for the control.

The autoignition temperature (5 second exposure, using a modification of the method described by Rogers, *Ind. and Eng. Chemistry*, September 1962, p. 169) was 620°F., compared to 625°F. for the control.

EXAMPLE V

Example IV was repeated using different proportions of variously oriented filaments of nitrocellulose in place of the chopped fibers. Thus there was employed, respectively, 0.1 percent and 1 percent of filaments oriented parallel to the major axis of the grain, 1 percent of filaments oriented at right angles to that axis, and 0.1 percent and 1 percent of woven cloth of nitrocellulose. In each case the slump at 180°F. was markedly less than that of the control.

When slump specimens (½ × ½ × 4½ inches) of PBAA propellant containing the nitrocellulose fibers as an additive, in various forms and orientations, were given a slump test of 180°F. for 46 days, the following results were obtained:

| Additive | Deflection from Horizontal (in inches) |
|---|---|
| None (control) | 4.0 |
| 0.6% of ⅛" chopped fiber | 1.4 |
| 0.5% of ⅛" chipped fiber | 1.2 |
| 1% of filaments oriented transverse to the length of the speciman | 1.0 |
| 1% of woven cloth | 0.5 |
| 1% of filaments oriented lengthwise of the specimen | 0.3 |

EXAMPLE VI

A cylindrical rocket grain was produced on a circular cylindrical mandrel by winding thereon closely spaced turns of nitrocellulose yarn, then impregnating the winding with a nitrocellulose plastisol propellant and than repeating the winding and impregnation several times, after which the assembly was heated at a temperature of 100° to 120°F. for approximately 4 hours to convert the plastisol into a homogeneous solid.

The plastisol propellant contained 23.5 percent commercial fluid ball nitrocellulose casting powder (the nitrocellulose containing 12.6 percent nitrogen content) having a particle size of approximately 50 microns; 23.5 percent triethyleneglycol dinitrate; 10.0 percent of atomized aluminum of 5 micron particle size; and 43.0 percent ammonium perchlorate powder of 35 micron approximate average particle size.

The yarn was composed of 200 continuous filaments of nitrocellulose of 7.5 denier per filament having a tenacity of 1.7 grams per denier and an elongation at break of 12.1 percent. The composition of the filaments was 94 percent nitrocellulose (12.6 percent nitrogen content), 5 percent of atomized aluminum powder of 5 micron average particle size and 1 percent of diphenylamine.

The impregnated mixture contained 9 percent yarn and 91 percent propellant.

Comparison of the physical properties gave the following results:

| | Propellant without yarn | Propellant containing 9% wound nitrocellulose yarn |
|---|---|---|
| Density (lbs/cu.in) | 0.060 | 0.059 |
| Hoop stress (psi) | 212 | 1585 |
| Elongation (%) | 5.5 | 10.2 |

| | | |
|---|---|---|
| Modulus of elasticity (psi) | 4300 | 30,000 |

During the mixing and subsequent heat treatment, the triethylene glycol dinitrate, which is a liquid plasticizer for nitrocellulose, perferentially plasticizers and swells the fluid ball casting powder into a homogeneous binder of plasticized nitrocellulose. Temperature and time are regulated as indicated to assure minimal plasticization, within consequential swelling and weakening of the nitrocellulose filaments. Within these operating limits, the liquid plasticizer is selectively absorbed by the casting powder due to a greater affinity therefor as a result of prior plasticization of the fluid ball casting powder with about 9 percent nitroglycerin.

EXAMPLE VII

A cylindrical rocket grain was produced on a circular cylindrical mandrel by winding thereon closely spaced turns of nitrocellulose yarn, then impregnating the winding with a liquid curable propellant and then repeating the winding and impregnation several times, after which the assembly was heated at a temperature of 120°F. for 4 hours to convert the propellant to a solid state by polymerization, including cross-linking.

There were used 35 percent of nitrocellulose yarn of Example VI and 65 percent propellant, the latter being made up to 31 percent P-13 liquid curable polyester (P-13 is a mixture of equal parts of styrene and unsaturated alkyd resin curable to a rubbery mass available from Rohm and Haas Co.), 0.8 percent aluminum powder of 5 micron average particle size and 34.2 percent finely divided ammonium perchlorate of 100 to 200 micron particle size.

As can be seen from the above examples a wide variety of propellants may be employed with the nitrocellulose fiber. Thus the propellants conventionally found in rockets may be used and these may be of the composite or the homogeneous type, for instance, and may be rigid or flexible. Additional examples of propellants are those in which the fuel and binder is a hydrocarbon, e.g. an asphalt-oil mix, a butadiene polymer or copolymer (e.g. a carboxy terminated polybutadiene, copolymer of butadiene and acrylic acid, terpolymer of butadiene, acrylic acid and acrylonitrile), a rubbery polysulfide polymer or polyurethane or epoxide, or monomer systems such as acrylonitriles, esters, acrylamides. The oxidizer may be of the usual type, e.g. potassium, lithium, sodium or ammonium perchlorate, ammonium nitrate, ammonium picrate, HMX, RDX, nitroguanidine, potassium nitrate. The ratio of binder to oxidizer may be in the range of 1:1 to 10:1, for example.

A typical homogeneous propellant of the "double base" variety contains about 10 to 98 percent nitrocellulose and about 2 to 60 percent of a nitrate ester plasticizer therefor such as nitroglycerin, diethyleneglycol dinitrate or trimethylolpropane trinitrate.

The proportion of nitrocellulose fibers is advantageously in the range of about 0.1 percent to 90 percent.

The nitrocellulose fibers may also be employed as a means of bringing together incompatible propellant components, which could otherwise not be mixed without deterioration. For example, there may be mixed with a nitrocellulose spinning dope an oxidizer such as HNF, NP, $HP_{23}$ and HP or other additives which are similarly unstable in the presence of atmospheric ambient conditions or other product components, i.e. TAZ, TAG or hydrides, which become encapsulated and are thereby shielded by the surrounding nitrocellulose fiber. As specific illustrations of the above, NP, for example, reacts violently with the moisture in the air and HNF, for example, is incompatible with most curatives, i.e. amines for organic epoxy prepolymers.

Numerous modifications may be made within the spirit and scope of the invention which will appear obvious to those of skill in the art.

We claim:

1. A motor casing and propellant composition therein, said motor casing comprising autocombustible continuous nitrocellulose filaments having a nitrogen content of about 10 to 15 percent and a tenacity of at least 0.5 grams per denier, said propellant composition comprising a solid propellant composition reinforced by an internal matrix comprising nitrocellulose fibers having a nitrogen content of about 10 to 15 percent.

2. The structure of claim 1 wherein said nitrocellulose filaments of said casing have a nitrogen content of about 11.5 to 14.0 percent, a tenacity of at least 2 grams per denier and a denier per filament in the range of about 2.5 to 4.0, said structure being characterized by filaments helically wound about the longitudinal axis of said motor at an angle to said axis of between about 20° and 60°, said structure being capable of withstanding internal hydrostatic pressures and further characterized by autocombustibility in the absence of oxygen to a residue weight that is not more than 10 percent by weight of said original structural weight.

3. The structure of claim 1 wherein a resinous thermoset filament-binder material binds said continuous nitrocellulose material into a unitary motor casing.

4. The structure of claim 1 wherein the reinforcing nitrocellulose fibers have a specific impulse not substantially less than that of said propellant composition.

5. The structure of claim 4 wherein the reinforcing fibers are staple length fibers distributed uniformly throughout said propellant composition.

6. The structure of claim 4 wherein the reinforcing fibers are continuous filaments distributed uniformly throughout said propellant composition and oriented in substantially parallel relation to the longitudinal axis of said propellant composition.

7. The structure of claim 4 wherein the reinforcing fibers are continuous filaments distributed uniformly throughout said propellant composition and oriented in substantially transverse relation to the longitudinal axis of said propellant composition.

* * * * *